United States Patent Office 3,770,849
Patented Nov. 6, 1973

3,770,849
LACTAM-VINYL BLOCK COPOLYMERS
Markus Matzner, Edison, James E. McGrath, Somerville, and Allen Noshay, East Brunswick, N.J., assignors to Union Carbide Corporation, New York, N.Y.
No Drawing. Filed Feb. 1, 1971, Ser. No. 111,703
Int. Cl. C08g 41/04
U.S. Cl. 260—857 G
37 Claims

ABSTRACT OF THE DISCLOSURE

Block copolymers are prepared from lactam monomer and vinyl polymer having the structure

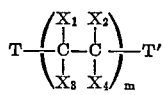

wherein $X_1$, $X_2$, $X_3$ and $X_4$ are selected substituent groups, T and T' are selected terminal groups and $m$ is a whole number of about 16 to 100,000. The polymers are prepared in a lactam anionic polymerization reaction using an alkaline catalyst and the vinyl polymer as an activator or initiator.

BACKGROUND OF THE INVENTION

(1) Field of the invention

The invention relates to block copolymers prepared from lactam monomer and selected vinyl polymers, as well as to the preparation of such block copolymers in an anionic polymerization system.

(2) Description of the prior art

Various vinyl polymers and lactam polymers are known to those in the art and may be prepared by various procedures. The lactam polymers, for example, may be prepared hydrolytically or anionically. In the anionic polymerization of the lactam monomers there is usually employed a catalyst-initiator system. The catalyst is usually a material which will form an alkali or alkaline earth metal salt of the lactam. The initiators or activators that have been used to date include a variety of compounds including some which are polymeric in nature, such as those disclosed in U.S. 3,016,367 and 3,207,713. The lactam polymers which have been prepared to date from ε-caprolactam monomer, however, generally, have disadvantages in that they are water sensitive (hygroscopic) and display only moderate impact strength properties. Various of the vinyl polymer materials which are commercially available to date also have disadvantages in that they have relatively low melting points or glass transition temperatures and they are susceptible to environmental stress-cracking, i.e., they crack under stress after prolonged exposure to various types of environments.

SUMMARY OF THE INVENTION

Novel block copolymers are prepared from lactam monomer and selected vinyl polymer materials. The block copolymers are prepared in anionic polymerization systems which contain an anionic catalyst and certain vinyl polymers as initiators or activators. The vinyl polymer forms a block of the resulting block copolymer.

An object of the present invention is to provide novel block copolymers from lactam monomer and vinyl polymers.

A further object of the present invention is to provide novel polymers based on lactam monomer and vinyl polymers which have properties which are substantially superior to those previously available in lactam polymers and such vinyl polymers.

Another object of the present invention is to provide a novel anionic polymerization system for use in the anionic polymerization of lactam monomers.

DESCRIPTION OF THE PREFERRED EMBODIMENT

It has now been found that novel block copolymers may be prepared from lactam monomer and vinyl polymer by anionically polymerizing the lactam monomer with a catalyst-initiator system which comprises, as the initiator or activator, one or more of certain vinyl polymers. The resulting block copolymers have substantially improved properties in that they combine the desirable properties of each of the polymeric components so as to provide an optimum balance of high temperature properties, stress-crack resistance, water sensitivity and impact strength.

THE LACTAMS

The lactams which may be used according to the present invention are all those which are capable of being polymerized anionically and are preferably those lactam monomers which contain at least one ring group of the structure

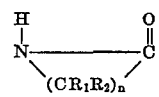

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bislactams such as alkylene bislactams of the formula:

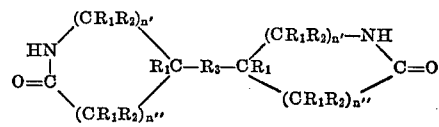

wherein $n'$ and $n''$ are each whole numbers such that $n'$ and $n''$ are each 2 to 14; $R_1$ and $R_2$ are as defined above; and $R_3$ may be $C_1$ to $C_4$ alkylene such as methylene, ethylene, propylene, and butylene; phenylene and substituted phenylene; O and S.

Other lactams having a plurality of ring structures include bicyclic lactams, such as those represented by the formulae:

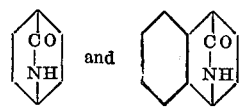

The lactams to be polymerized can be used individually or in any combination thereof.

THE INITIATOR

The initiator which is to be employed in the preparation of the block copolymers of the present invention is a vinyl polymer having one or two terminal groups which are activated towards reaction with the lactam, or alkali or alkali earth metal salt of the lactam, being polymerized so as to form an actively substituted lactam. The recurring units of the vinyl polymer may contain any substituent groups which are less reactive to such lactam or the metal salt thereof, than the activated terminal groups. Substituent groups which would usually be too reactive to use on the recurring vinyl monomer groups would include ester groups. The preferred vinyl polymer initiators, therefore, are those which would comprise the structure

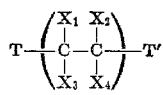

wherein $X_1$, $X_2$, $X_3$ and $X_4$ are the same or different radicals, and are preferably H; $C_1$ to $C_{20}$ hydrocarbon; halogen, such as Cl, F, Br or I; OR'; $(OR')_2$; COR', pyridyl, carbazolyl and pyrrolidinyl, or a pair of $X_1$, $X_2$, $X_3$ and $X_4$ may form a double bond, T is a terminal group which is capable of initiating the anionic polymerization of lactam monomer, i.e., it is a group which is activated towards reactions with lactam monomer, or the alkali or alkaline earth metal salt of the lactam monomer to form an actively substituted lactam, T' is T, or an inert terminal group such as H, or an inert radical resulting from a chain transfer reaction, R' is a monovalent $C_1$ to $C_{20}$ hydrocarbon radical, and $m$ is a whole number of about 16 to 100,000.

The value of $m$ is such that the molecular weight of the vinyl polymer initiator is at least about 500. The value of $m$, therefore, will vary to some extent, depending on the $X_1$, $X_2$, $X_3$, $X_4$, T and T' groups which are used in the initiator.

When $X_1$, $X_2$, $X_3$ or $X_4$ comprise a hydrocarbon group, such group(s) may be unsubstituted, or they may be substituted with one or more inert substituent groups.

A pair of the $X_1$, $X_2$, $X_3$ or $X_4$ groups may also form an inert bridging group.

The T, or active, terminal groups must be more reactive to the anionic polymerization catalyst being used, than any of the $X_1$, $X_2$, $X_3$ or $X_4$ substituent groups.

Examples of T groups are:

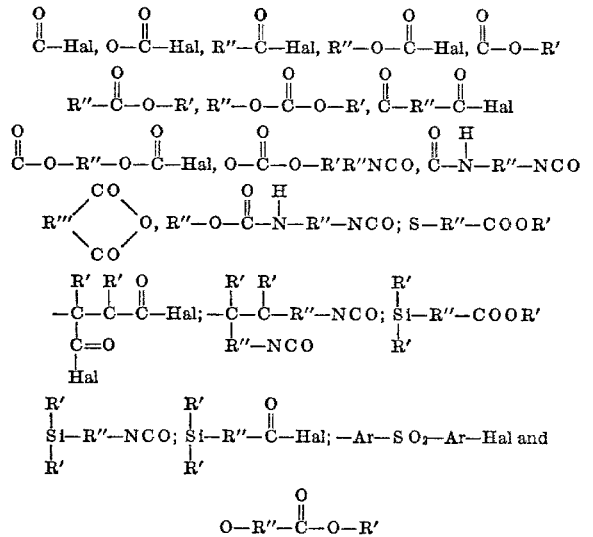

wherein

Hal is a halogen radical, i.e., Cl, Br, F or I,

R' is a monovalent $C_1$ to $C_{20}$ hydrocarbon radical,

R'' is a divalent $C_1$ to $C_{20}$ hydrocarbon radical,

R''' is a trivalent $C_1$ to $C_{20}$ hydrocarbon radical, and

Ar is a mono- or polynuclear divalent aryl moiety residue.

The term aryl moiety residue, as used in the context of the present invention, means the carbocyclic residue of an aryl compound, which may be mono- or polynuclear in nature.

The term $C_1$ to $C_{20}$ hydrocarbon includes all saturated or unsaturated hydrocarbon radicals containing 1 to about 20 carbon atoms and which are monovalent, such as aliphatic radicals, such as methyl, ethyl, vinyl, propyl, cyclopropyl, isopropyl, butyl, cyclobutyl, isobutyl, amyl, isoamyl, cyclopentyl, hexyl, isohexyl and cycloheptyl; aromatic radicals such as phenyl, tolyl, benzyl, styryl, cumentyl, biphenyl and naphthyl.

The polymeric backbones of the polymeric initiators of the present invention may be formed from an individual ethylenically unsaturated monomer or they may be formed from one or more ethylenically unsaturated monomers and from 0 to about 50 mol percent of one or more non-vinyl monomers which are interpolymerizable with vinyl monomers. The term "ethylenically unsaturated monomer" means a compound which contains at least one polymerizable group of the formula

Such monomers, therefore, would include the following: unsubstituted olefins including monoolefins such as ethylene, propylene, 1-butene, isobutylene and norbornene and polyenes such as butadiene, isoprene, dicyclopentadiene and norbornanedienes; halogenated olefins such as chloroprene, tetrafluoroethylene, trifluoroethylene, hexafluoropropylene; vinyl aryls such as styrene, o-methoxystyrene, p-methoxystyrene, m-methoxystyrene, p-chlorostyrene, o-methylstyrene, p-methylstyrene, m - methylstyrene, $\alpha$-methylstyrene, p-phenylstyrene, o-phenylstyrene, m-phenylstyrene, stilbene, 1,1-diphenyl ethylene, vinyl-naphthalene and the like; vinyl and vinylidene halides, such as vinyl chloride, vinyl fluoride, vinylidene chloride, vinylidene fluoride, vinylidene bromide and the like; vinyl alkyl ethers and ketones such as vinyl methyl ether, vinyl ethyl ether, vinyl isobutyl ether, 2-chloroethyl vinyl ether, methyl vinyl ketone ethyl vinyl ketone, isobutyl vinyl ketone and the like; also vinyl pyridine, N-vinyl carbazole, N-vinyl pyrollidine, acrolein, vinyl acetal, vinyl butyral and the like. Non-vinyl monomers which may be interpolymerizable with the ethylenically unsaturated monomers include carbon monoxide, formaldehyde and epoxides such as ethylene and propylene oxide.

Where such non-vinyl monomers are used to prepare a polymeric initiator, the initiator will also comprise one or more units of such non-vinyl monomers. The polymeric initiator would then comprise the structure

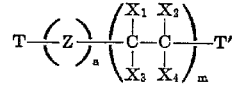

wherein T, T', $X_1$, $X_2$, $X_3$, $X_4$ and $m$ are as defined above, Z is a non-vinyl monomeric unit and $a$ is an integer which is $\geq 1$ and is such that the molecular weight of the polymeric initiator is at least 500.

Examples of the Z radicals would include CO, $CH_2O$, R'CHO and $R_2''''CCR_3''''O$ wherein R'''' is H or a monovalent $C_1$ to $C_{20}$ hydrocarbon radical.

The vinyl polymer initiators may also include up to about 10 mol percent of vinyl monomer units which contain COOH and OH groups, such as acrylic acid, methacrylic acid and vinyl alcohol. Although these groups will react with the anionic polymerization catalyst, excess catalyst can be used to compensate for the presence of such groups in the polymer. Unlike ester groups, when the COOH and OH groups react with the catalyst they do not provide anionic polymerization initiatting sites.

Also included within the term "vinyl polymer" are blends of two or more of the vinyl polymers.

Where two or more vinyl monomers are used to form a vinyl polymer, the vinyl monomer moieties may be dispersed in a random or block fashion in the polymeric chain, or one or more chains of vinyl monomer moieties may be grafted to other chains of monomer moieties.

The vinyl polymers are solid or liquid materials which may be used in any of the forms in which they are commonly employed in the molding arts such as in the form of powder, pellets, granules and the like.

The vinyl polymer backbones may be saturated, or may contain up to about one double bond per vinyl monomer unit in the backbone of the polymer, depending on the monomers employed in preparing them, and in the procedures used in terminating them. Where such unsaturation is present it is represented in the above described structure of the block copolymers by a pair of $X_1$, $X_2$, $X_3$ and $X_4$.

The T and T′ terminal groups may be formed during the polymerization of the vinyl monomer(s), or the terminals may be formed thereafter, by techniques known to those in the art such as by free radical initiation of the vinyl polymerization reaction with initiators which will provide the desired T and/or T′ terminal groups; or by telomerization reactions wherein the vinyl monomer is polymerized with the aid of a telogen, which telogen supplies one or both of the T and T′ groups; or by reaction of a growing vinyl polymer in a polymerization reaction system with a chain transfer agent which supplies the T and T′ groups.

As will be explained in more detail below, it is to be noted that when the T and T′ terminated vinyl polymer is used as an anionic polymerization initiator, according to the present invention, the copolymers that are thus prepared may be either AB or ABA type block copolymers wherein A comprises a lactam polymer block and B comprises a vinyl polymer block. Generally speaking, the AB type block copolymers are formed when only one of the T and T′ terminals is an active terminal, and the ABA type block copolymers are formed when both the T and T′ terminals are active terminals.

The various free radical initiators, telogens, chain transfer agents and the like reactants which are used to provide the T and T′ terminals on the vinyl polymer can be so selected as to provide vinyl polymers with one or two active T and T′ terminal groups.

USE OF FREE RADICAL INITIATOR TO PREPARE VINYL POLYMER INITIATORS

The direct preparation of T and T′ terminated vinyl polymers by the use of free radical initiators may be illustrated by the following reaction wherein diethyl-azo-isobutyrate is used as the free radical initiator to polymerize a vinyl monomer such as a $C_2$ to $C_{20}$ mono-olefin.

$$\text{(vinyl monomer)} + C_2H_5-O-\overset{O}{\underset{}{\overset{\|}{C}}}-\overset{CH_3}{\underset{CH_3}{\overset{|}{\underset{|}{C}}}}-N=N-\overset{CH_3}{\underset{CH_3}{\overset{|}{\underset{|}{C}}}}-\overset{O}{\underset{}{\overset{\|}{C}}}-O-C_2H_5 \longrightarrow$$

$$N_2 + C_2H_5-O-\overset{O}{\underset{}{\overset{\|}{C}}}-\overset{CH_3}{\underset{CH_3}{\overset{|}{\underset{|}{C}}}}-[\text{poly(vinyl monomer)}]-\overset{CH_3}{\underset{CH_3}{\overset{|}{\underset{|}{C}}}}-\overset{O}{\underset{}{\overset{\|}{C}}}-O-C_2H_5$$

The T and T′ terminal groups are thus the same and are each

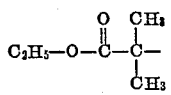

It is to be understood that not all the vinyl polymer chains will have two such terminals in the usual case. This will depend on the experimental conditions. Some of the chains will only be terminated by one of such ester groups.

Where the vinyl polymer chain contains one of such ester terminal groups, such polymer can be used to form an AB type block copolymer, and where the vinyl polymer chain contains two of such ester terminal groups, such polymer can be used to form an ABA type copolymer, as will be disclosed in more detail below.

The following Table I provides a list of various free radical initiators which may be used to directly provide T and T′ groups on the vinyl polymers made therewith, as well as an indication of the specific T and T′ groups which are derived from each of the listed free radical initiators.

TABLE I.—TERMINALS FROM FREE RADICAL INITIATORS

| Free radical initiator | T (active) | T′ (inactive) |
|---|---|---|
| $[R'-O-\overset{O}{\overset{\|}{C}}-R'']_2-(N=N)$ | $R'-O-\overset{O}{\overset{\|}{C}}-R''-$ | |
| $[R'-O-\overset{O}{\overset{\|}{C}}-R'']_2O_2$ | $R'-O-\overset{O}{\overset{\|}{C}}-R''-O-$ | |
| $[N\equiv C-R'']_2(N=N)$ | | $N\equiv C-R''-$ (can be converted to active ester groups). |

R′ and R″ are as defined above.

The ester terminated vinyl polymers made as disclosed above with the free radical initiators can be further reacted with other reactants to thus indirectly form different active T terminal groups on the vinyl polymers. For example, the ester groups can be hydrolyzed and reacted with phosphorus halides or thionyl halides to provide active terminals of the structure

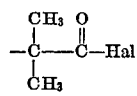

wherein Hal is as defined above.

The ester groups may also be hydrolyzed to form the free acid (—COOH) and the acid in turn can be hydrogenated to form the alcohol (—$CH_2OH$). The alcohol can then be reacted to form various other groups as shown in Table II.

TABLE II

| Reactant for (—$CH_2OH$) | Resulting end group |
|---|---|
| $Cl-\overset{O}{\overset{\|}{C}}-R''-\overset{O}{\overset{\|}{C}}-Cl$ | $-CH_2-O-\overset{O}{\overset{\|}{C}}-R''-\overset{O}{\overset{\|}{C}}-Cl$ |
| $COCl_2$ | $-CH_2-O-\overset{O}{\overset{\|}{C}}-C$ |
| $Cl-\overset{O}{\overset{\|}{C}}-O-R''-O-\overset{O}{\overset{\|}{C}}-Cl$ | $-CH_2O-\overset{O}{\overset{\|}{C}}-O-R''-O-\overset{O}{\overset{\|}{C}}-Cl$ |
| $OCN-R''-NCO$ | $-CH_2-O-\overset{O}{\overset{\|}{C}}-\overset{H}{\overset{\|}{N}}-R''-NCO$ |

R″ is as defined above.

USE OF TELOGENS, CHAIN TRANSFER AGENTS AND SIMILAR CAPPING AGENTS TO PREPARE VINYL POLYMER INITIATORS

Telogens, chain transfer agents, and similar capping agents may also be used to directly position T and T′ terminals on the vinyl polymer chains. The use of such capping agents is well known in the art. The capping agent usually splits into two components under the conditions under which it is employed, and one of these two components becomes the T terminal, and the other becomes the T′ terminal. There is usually no by-product formed when such capping agent is used. Tables III and IV below provide lists of various telogens and chain transfer agents which may be used to directly provide T and T′ groups on the vinyl polymer chains, as well as an indication of the specific T and T′ groups which are derived from each of the listed capping agents.

TABLE III

| Telogen | Terminals from telogen | |
|---|---|---|
| | T (active) | T' (inactive) |
| Br—R''—COOR' | —R''—COOR' | Br |
| CCl₄ | | Cl, CCl₃ [1] |
| CHCl₃ | | Ch, CCl₃ [1] |
| BrCCl₃ | | Br, CCl₃ [1] |

[1] Can be hydrolyzed to an acid of structure —COOH and then converted to an ester group having the structure COOR'.

R' and R'' are as defined above.

TABLE IV

| Chain transfer agent | Terminals from chain transfer agents | |
|---|---|---|
| | T (active) | T' (inactive) |
| HS—R''—COOR' | —S—R''—COOR' | H |
| (R'OOC—R'')₂S₂ | —S—R''—COOR' | |

R' and R'' are as defined above.

USE OF LIVING POLYMERS TO PREPARE VINYL POLYMER INITIATORS

The T and T' terminal groups may also be indirectly provided on the vinyl polymers via another two step procedure. In the first step, a so-called living polymer is prepared from anionic type polymerization initiators. These initiators provide intermediate terminal groups, which may be termed Y and Y'. The desired T and T' terminal groups are affixed to the polymer in the second step of the process by reacting the Y and Y' terminated polymer with suitable reactants. Examples of the anionic initiators which may be used to form the living polymers, and the intermediate Y and Y' terminals provided therewith, are listed below in Table V. A list of the reactants that may be reacted with the Y and Y' terminated vinyl polymers, and the resulting T and T' terminals that may be obtained from such reactants are listed below in Table VI. It is to be noted that not all the Y and Y' terminals would be active with respect to the reactant which is used in the second step of the reaction. Where such Y or Y' terminal is not so reactive, it will remain on the vinyl polymer and become an inactive T' terminal.

The indirect preparation of T and T' terminated vinyl polymers by the use of a "living polymer" may be generally illustrated by the following sequence of reactions. In the first reaction, a living polymer of a vinyl monomer such as alphamethyl styrene, butadiene, etc., is prepared using sodium metal as a catalyst, i.e.

(vinyl monomer) + 2Na ⟶ Na⊕⊖ $\underset{\text{"living polymer"}}{\text{Poly(vinyl monomer)}}$ ⊖⊕Na This reaction can be conducted in an inert organic solvent such as toluene, at atmospheric pressure and at temperatures of about −78° C. to +100° C. The Y and Y' terminals on the resulting polymer are the same in this case and are Na⊕.

In the second step in the procedure, the Na terminated vinyl polymer is then reacted with a material such as an aryl dihalo formate such as Bisphenol A dichloroformate to provide the desired T and T' terminated vinyl polymer initiator, i.e., T' terminals on the resulting polymer are the same in this case and are

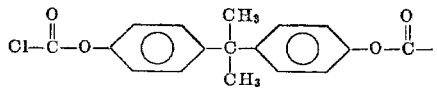

This resulting T and T' terminated vinyl polymer may then be reacted in the presence of base, with lactam monomer, as disclosed below, to form the ABA block copolymer.

To prepare an AB type block copolymer, starting with a living vinyl polymer, an anionic polymerization initiator such as butyl lithium can be used instead of sodium metal. Then the Y and Y' terminals will be C₄H₉ and Li⊕. When this polymer is reacted with an aromatic halo i.e., chloro, formate, only the Li⊕ site reacts with the chloroformate, as in the case of the Na⊕ site, to form a single active T terminal, with LiCl as a by-product.

Thus the Na⊕ or Li⊕ terminated living polymers can be reacted with a compound of the structure COHal₂ to provide T terminals of the structure

(with NaHal or LiHal as a by-product); or the Na⊕ and Li⊕ terminated living polymer can be reacted with a compound of the structure

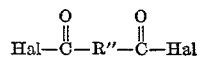

to provide T terminals of the structure

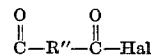

(with NaHal or LiHal as a by-product), and wherein Hal and R'' are as defined above.

TABLE V

| Initiators for living polymers | Terminals from living polymer initiators | |
|---|---|---|
| | Y | Y' |
| (a) Met | Met | Met |
| (b) R'Met | R' | Met |
| I.e., butyl lithium | C₄H₉ | Li |
| Sodium naphthalene | Na | Na |
| (c) Met-R''-Met | Met | Met |

R' and R'' are as defined above, and Met is an alkali metal such as Li, Na or K.

TABLE VI

| Reactants for Y and Y' terminals to provide t and T' terminals | Terminals from such reactants | |
|---|---|---|
| | T (active) | T' (inactive) |
| Hal—C(=O)—O—R''—O—C(=O)—Hal | O=C(—Hal)(O—) | None. |
| Hal—C(=O)—R''—C(=O)—Hal | C(=O)—Hal | Do. |
| OCN—R''—NCO | O=C—N(H)—R''—NCO | Do. |
| Hal—CO—Hal | C(=O)—Hal | Do. |

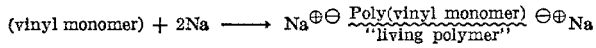

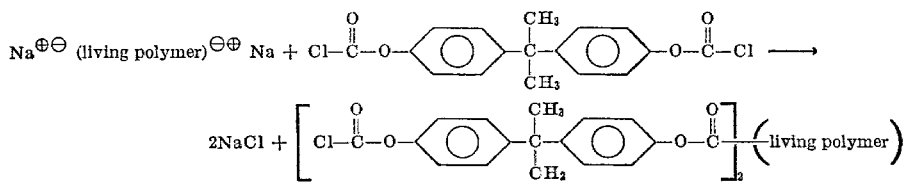

This reaction can be conducted in an inert organic solvent such as toluene, at atmospheric pressure and at temperatures of about −25° C. to +100° C. The T and T'

Hal and R'' are as defined above.

GRAFTING AND ADDITION REACTIONS TO PREPARE VINYL POLYMER INITIATORS

Many vinyl polymers, such as the low density or low molecular weight polyolefins such as polyethylene, as well as the polystyrenes, contain terminal unsaturation when they are directly prepared with polymerization initiators or catalysts, such as, oxygen, mono-peroxides or azo compounds, since such initiators or catalysts do not provide terminal groups at either or both of the ends of the polymeric chains. This terminal unsaturation, therefore, can be used as a means for grafting or adding T and T' terminals to the unsaturated ends of the vinyl polymer chains. Reactants that can be used in these grafting reactions, as T or T' terminal donors, are generally known in the art, and would include unsaturated compounds such as anhydrides of dibasic unsaturated carboxylic acids, such as maleic anhydride and unsaturated isocyanates.

The use of the addition agents is also known in the art. They are added to the unsaturated ends of the vinyl polymers in a catalyzed addition reaction in which catalysts such as the noble metals, i.e., platinum or palladium and other catalysts such as potassium chloroplatinate, ruthenium chloride, tertiary amines and chloroplatinic acid cause the addition, to the vinyl polymers, of compounds such as $$H-\underset{R'}{\overset{R'}{\underset{|}{Si}}}-R''-COOR'$$

wherein R' and R'' are as defined above.

When these grafting and addition compounds are used only a portion of such compounds are actually used to form the T and T' terminals.

Lists of grafting and addition compounds that may be used in this regard, with the resulting T and T' terminals that may be obtained therewith are listed below in Tables VII and VIII respectively.

TABLE VII

| Grafting agent for terminally unsaturated vinyl polymer | Terminals from grafting agents | |
|---|---|---|
| | T (active) | T' (inactive) |
| $\overset{CH-C\diagup\overset{O}{\diagdown}}{\underset{CH-C\diagdown\underset{O}{\diagup}}{\parallel}}O$ | $\overset{-CH-C\diagup\overset{O}{\diagdown}}{\underset{CH-C\diagdown\underset{O}{\diagup}}{\phantom{\parallel}}}O$ | None. |
| $\overset{R'-C-C\diagup\overset{O}{\diagdown}}{\underset{R'-C-C\diagdown\underset{O}{\diagup}}{\parallel}}O$ | $\overset{-\overset{R}{\underset{|}{C}}-C\diagup\overset{O}{\diagdown}}{\underset{R'-C-C\diagdown\underset{O}{\diagup}}{\phantom{\parallel}}}O$ | Do. |
| R'—C—COCl<br>R'—C—COCl | $-\overset{R'}{\underset{|}{C}}-COCl$<br>R'—C—COCl | Do. |
| R'—C—R''—NCO<br>R'—C—R''—NCO | —C—R''—NCO<br>R'—C—R''—NCO | Do. |

R' and R'' are as defined above.

TABLE VIII

| Addition agents for terminally unsaturated vinyl polymers | Terminals from addition agents | |
|---|---|---|
| | T (active) | T' (inactive) |
| $H-\underset{R'}{\overset{R'}{\underset{|}{Si}}}-R''-COOR'$ | $-\underset{R'}{\overset{R'}{\underset{|}{Si}}}-R''-COOR$ | None. |
| $H-\underset{R'}{\overset{R'}{\underset{|}{Si}}}-R''-NCO$ | $-\underset{R'}{\overset{R'}{\underset{|}{Si}}}-R''-NCO$ | Do. |
| $H-\underset{R'}{\overset{R'}{\underset{|}{Si}}}-R''-\overset{O}{\overset{\parallel}{C}}Cl$ | $-\underset{R'}{\overset{R'}{\underset{|}{Si}}}-R''-\overset{O}{\overset{\parallel}{C}}Cl$ | Do. |

R' and R'' are as defined above.

THE BLOCK POLYMERS

The block copolymers of the present invention are block copolymers of the AB and ABA types, wherein A represents a block of lactam polymer and B represents the vinyl polymer block. In the usual case these two types of block copolymers are concurrently prepared in the polymerization reaction. These two types of block copolymers may also be represented by the structure:

$$A-X_5-\left[\begin{array}{cc}X_1 & X_2\\|&|\\C-C\\|&|\\X_3 & X_4\end{array}\right]_m-X_5-A$$

for the ABA copolymers, and $$T'-\left[\begin{array}{cc}X_1 & X_2\\|&|\\C-C\\|&|\\X_3 & X_4\end{array}\right]_m-X_5-X$$

and $$A-X_5-\left[\begin{array}{cc}X_1 & X_2\\|&|\\C-C\\|&|\\X_3 & X_4\end{array}\right]_m-T'$$

for the AB type block copolymers, and wherein A, $X_1$, $X_2$, $X_3$, $X_4$, T' and $m$ are as defined above; $X_5$ is the residue of the reaction between the active initiator terminals T, and the salt of the lactam being polymerized. For example, where T is $$\overset{O}{\overset{\parallel}{C}}-Hal$$

then $X_5$ is $$\overset{O}{\overset{\parallel}{C}}$$

The A chains of lactam monomer attach to the initiator at the site of, and upon the removal during the initiating reaction of, all or part of one or both of the active terminal groups.

Although all of the above described T terminal groups are active enough to serve as initiating sites, with a given polymeric initiator not all of such individual T sites will react.

A typical initiating reaction is believed to proceed in two steps as follows:

(1)

$$2T-\left[B'\right]_m-T' + 4Me-N-\overset{O}{\overset{\parallel}{C}}\underset{R_0}{\diagup} \longrightarrow$$

$$T'-\left[B'\right]_m-X_5-N-\overset{O}{\overset{\parallel}{C}}\underset{R_0}{\diagup} + \overset{O}{\overset{\parallel}{C}}-N-X_5-\left[B'\right]_m-T' +$$

$$\overset{O}{\overset{\parallel}{C}}-N-X_5-\left[B'\right]_m-X_5-N-\overset{O}{\overset{\parallel}{C}}\underset{R_0}{\diagup} + 4MeX_t$$

(2) $\xrightarrow[\text{moles of lactam}]{d+e+f+g}$ 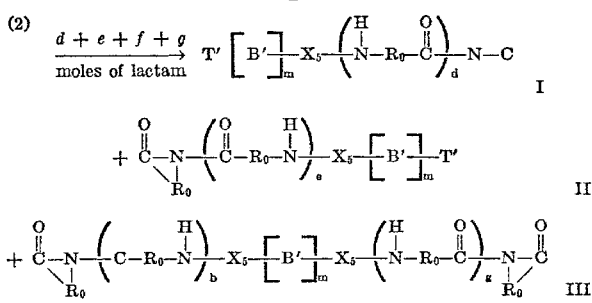

wherein I and II represent AB type copolymers, III represents an ABA type copolymer, Me is the metal cation of the catalyst, $R_0$ is that portion of the lactam monomer polymerized which lies between the nitrogen atom and the carbonyl carbon atom of such lactam, B' is

and $X_1$, $X_2$, $X_3$, $X_4$, T and T' are as defined above, and each of $d$, $e$, $f$, and $g$ are whole numbers which are $>1$, and where

| T | $X_5$ | $X_6$ |
|---|---|---|
| COHal | CO | Hal |
| OCOHal | OCO | Hal |
| R″COHal | R″CO | Hal |
| R″OCOHal | R″OCO | Hal |
| COOR′ | CO | OR′ |
| R″COOR′ | R″CO | OR′ |
| COR″COHal | COR″CO | Hal |
| OCOR″OCOHal | OCOR″OCO | Hal |
| R‴⟨CO\O\COO⟩ | R‴⟨CO\COO⟩ |  |
| OCOOR′ | OCO | OR′ |
| R″NCO | R″NHCO |  |
| CONHR″NCO | CONHR″NHCO |  |
| R″OCOOR′ | R″OCO | OR′ |
| R″OCONHR″'NCO | R″OCONHR″'NHCO |  |
| SR″COOR′ | SR″CO | OR′ |
| CR′CR′COHal / COHal | CR′CR′CO / CO | 2Hal |
| CR′CR′R″NCO / R″NCO | CR′CR′R″NHCO / R″NHCO |  |
| Si(R′)$_2$R″COOR | Si(R′)$_2$R″CO | OR |
| Si(R′)$_2$R″NCO | Si(R′)$_2$R″NHCO |  |
| Si(R′)$_2$R″COHal | Si(R′)$_2$R″CO | Hal |
| ArSO$_2$ArHal | ArSO$_2$Ar | Hal |
| OR″COOR′ | OR″CO | OR′ |

In the case where T contains an NCO group, or is

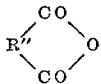

no $X_6$ moiety splits off, and the entire $X_5$ moiety is retained in the block copolymer, as noted above.

It can be seen therefore, that one of the important aspects of the present invention is the fact that a variety of initiators are provided for the preparation of lactam polymers all of which initiators are, basically, vinyl polymer materials, properly terminated. The variation in the initiator species is thus readily obtained merely by changing the terminal group on the vinyl polymer materials. It is thus possible to prepare block copolymers containing blocks of the lactam polymer and of the vinyl polymers under various reaction conditions and in various types of reaction equipment. This concept is important because various types of equipment require different types of processing times and polymerization times. Some types of equipment require the use of slower or faster polymerization systems than do other types of equipment. Thus, the so-called "pot life" of the polymerization system is important in lactam polymerization technology. "Pot life," as the term is used herein, means that period of time within which a polymerization system is workable, that is, remains in a shapeable consistency. In the polymerization of lactam monomers today it is a common practice to polymerize the monomer in-situ, as in a casting or extrusion polymerization procedure, wherein the end product is cast or extruded in an almost one-step operation, simultaneously with the polymerization of the lactam monomer. It is important, therefore, that the catalyst-initiator system used for these various types of polymerization procedures be capable of providing the necessary pot life so that the polymerization system can be used in such procedures. When used on a vinyl polymer initiator of a given molecular weight, the following is a listing of the relative order of the activity of various types of terminal groups:

The following Table IX, moreover, provides an indication of the length of the pot life that might be obtained under different temperature conditions by the use of various of the terminal groups on a vinyl polymer initiator of the present invention having a molecular weight of about 5,000; using about 0.1 to 3 mol percent of such initiator and about 1 to 2 mol percent of sodium hydride as a catalyst with ε-caprolactam monomer.

TABLE IX

| Terminal group | Pot life of polymerization system in minutes | | | |
|---|---|---|---|---|
| °C | 150 | 200 | 220 | 250 |
| Ar-SO$_2$-Ar-Cl | 45 | 5 | 2 | 1 |
| COOR′ | 10 | 2 | 0.5 | <0.25 |
| NCO | 1 | 0.5 | 0.25 | <0.1 |

Ar and R' are as defined above.

The block copolymers of the present invention formed from the vinyl polymers and lactams disclosed above are unique semi-crystalline materials which have physical properties which are superior in various respects to either a homopolymer of the corresponding lactam or of the vinyl monomer. They are superior, for example, to the lactam homopolymers, particularly in the case where the lactam is ε-caprolactam and the lactam homopolymer is thus a nylon-6 polymer, because nylon-6 is very water sensitive, i.e., hygroscopic. The block copolymers of the present invention have substantially less affinity for water than the nylon-6 homopolymers.

The block copolymers are also superior to the vinyl homopolymer materials from which they are formed because they have superior high temperature properties and stress-crack resistance properties.

The preferred copolymers of the present invention are those which contain about 20 to 80 weight percent of the lactam monomer in the form of block segments therein, and about 80 to 20 weight percent of the vinyl polymer materials as block segments therein.

THE CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, For example, if a reinforcing filler were to be used, such filler should be used in such amounts as to provide the desired reinforcing effect.

The block copolymers made by the process of the present invention may be used for a number of applications which require the use of molded articles prepared from lactam and vinyl polymers such as fibers, films, engineering structures, coatings and hollow articles such as tubing and solvent tanks.

The following examples are merely illustrative of the present invention and are not intended as a limitation upon the scope thereof.

The properties of the block copolymers produced in the examples were determined by the following test procedures.

| Property: | Test procedure |
|---|---|
| Tensile strength, p.s.i. | ASTM D–638. |
| Tensile modulus, p.s.i. | ASTM D–638. |
| Melt index, decigrams per minute | ASTM D–1238–62T. |
| Elongation at break, percent | ASTM D–638. |
| $T_g$, °C. | Tex. Res. J., 1955. |

Reduced viscosity

Reduced viscosity (R.V.) was measured in m-cresol (unless otherwise noted) at 25° C. The time taken for the polymer solution to flow in an Ostwald viscometer was compared with the time taken for the pure solvent. The R.V. was calculated from the equation:

$$R.V. = (S.T. - B.T.)/B.T. \; (1/C.)$$

where S.T. is sample time (in seconds), B.T. is blank time (in seconds) and C. is concentration in grams/deciliter. The units of the R.V. values are then deciliters/gram.

Pendulum impact

Thin film specimens (1/8 inch wide and shear cut from a film of the polymer) were used to measure impact properties. The impact characteristics of the films were determined on a modified Baldwin impact tester. A 1/4 in. diameter rod was used as the impacting head of the pendulum. A 1" by 1/8 in. film sample was mounted transverse to the path of the pendulum and located at the bottom of the swing. The 1/4 in. rod struck the 1/8 in. face of the sample half way between the ends. The energy to break the sample was determined by the difference between the initial height and the recovery height of the pendulum after it had broken the sample.

$$\text{Pendulum impact ft. lb./in.}^3 = \frac{\text{Pendulum energy loss}}{\text{Volume of sample}}$$

Glass transition temperature

The glass transition temperature was determined on thin film samples by measuring the recovery characteristics as a function of temperature. A film specimen was strained 1% at the rate of 10%/min. and then allowed to return at the same rate. The recovery of resilience was calculated from the ratio of the recovered length to original length. This test was repeated at elevated temperatures. A programmed rate of heating of 1.5–2° C./min. was used, measurements being repeated at intervals of 3–5° C. The glass transition temperature $T_g$ is defined as the minimum in a plot of resilience versus temperature.

$T_m$, or melting point

This is the temperature that can be determined from the modulus-temperature curves and at which the tensile modulus has a value of 100 p.s.i. This temperature is often referred to as $T_2$ instead of $T_m$.

EXAMPLES

General.—All solvents were freshly distilled before use and all glassware were flame-dried before use. All melt indices were recorded at 250° C. on a Tinius Olsen Extrusion Plastometer Model 2 according to ASTM D–1238–62T. Reduced viscosities of all samples were obtained on 0.2 wt. percent solutions at 25.0±.1° C. in a constant temperature water bath. All blank flow times (for pure solvent) were kept between 90 and 120 secs. The nylon block content on all block copolymer samples was determined by nitrogen analysis by the Kjeldahl technique.

The butyl lithium initiator employed was a 22.2 wt. percent solution in hexane.

Preparation of lactam polymerization catalyst solution.—ε-Caprolactam (30 grams, 0.26 mole) was heated at 85° C. under argon in a 250-ml., 3-neck, round-bottom flask equipped with magnetic stirrer, septum cap, reflux condenser with drying tube, and gas inlet. Sodium hydride dispersion (57% by weight dispersion in mineral oil; 2.62 grams, 0.0625 mole) was added to the molten ε-caprolactam and stirred under argon until dissolution was complete. The catalyst could then be removed employing a syringe which had been dried in vacuo at 120° C. This catalyst solution was used up to six hours after its preparation.

Example I

Preparation of a polystyrene-nylon 6 block copolymer via the n-butyl lithium initiated anionic polymer of styrene.—Styrene (104 grams, 1 mole) (freshly distilled) and toluene (100 ml., freshly distilled) were placed in a 500 ml., 3-neck, round-bottom flask equipped with mechanical stirrer, reflux condenser with drying tube, gas inlet, and septum cap.

A Claisen head was used to expand the flask to a 4-neck system. The vessel was purged with argon and cooled in an ice-bath as butyl lithium was added dropwise to the reaction mixture. The butyl lithium was added until an orange color persisted and then a measured amount (2 ml.) of this initiator was added. The reaction was continued at 25–30° C. for three hours.

The resulting reaction was terminated by the addition of a solution (2 mls. of 10% by weight solution) of bis-A-dichloroformate (freshly recrystallized from hexane) in toluene. A small portion of this toluene solution was coagulated in methanol, filtered, dried, and the R.V. of the polystyrene determined (0.2% in benzene), the result showed an R.V. of 0.16. The polystyrene was terminated at both ends of the polymer chain as shown here:

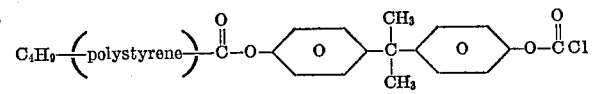

ε-Caprolactam (30 grams, 0.26 mole) was then added to the reaction vessel and the toluene distilled (using an oil bath) into a receiving flask. After the toluene was removed, the temperature of the bath was slowly brought up to 210° C. and the lactam polymerization catalyst (5 mls.) was injected into the reaction vessel and stirring continued for two minues. The stirring was stopped and the stirring rod lifted to the top of the flask above the molten mass. Heating was continued for five minutes under argon.

The mixture was then cooled. The resulting AB type block polymer was broken into pieces and crushed on a Wiley mill, extracted with methanol on a Soxhlet extractor, and dried overnight (24 hrs.) in vacuo at 110° C. The block polymer analyzed for 3.32 weight percent of nitrogen corresponding to 26.8 weight percent of nylon 6 blocks in the copolymer. The R.V. of the block copolymer in m-cresol was 0.42, and its melt index (250° C., 1P) was 60. The mechanical properties of the block copolymer were as follows:

| | |
|---|---|
| Tensile modulus, p.s.i. | 165,000 |
| Tensile strength, p.s.i. | 3,100 |
| Elongation at break, percent | 2 |
| Pendulum impact, ft. lbs./in.$^3$ | 2 |
| $T_g$ (polystyrene block), °C. | 85 |
| $T_m$ (nylon-6 block), °C. | 220 | benzoates, sulfites and bisulfites; Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 4, mole percent of catalyst is used per mole of lactam monomer being polymerized.

The catalyst and initiator are employed in a mole ratio to each other of about 2 to 200, and preferably, 3 to 10.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

THE POLYMERIZATION PROCESS

The polymerization reaction is preferably conducted in bulk. Under such bulk polymerization procedures the vinyl polymer initiator is preferably dissolved in the monomeric lactam. This can be accomplished easily at temperatures between 80° C. and 260° C. When initiators are used which contain less reactive end groups, i.e.,

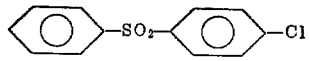

then the solution of initiator in lactam monomer may be stored in the liquid or molten state at temperatures which are slightly above the melting point of the monomeric lactam, i.e., about 70–75° C. for ε-caprolactam monomers, for up to about 40 hours without any appreciable change in the viscosity of the system or potency of the catalyst-initiator system. This provides an unusually long pot life for the molten system at such temperatures. The pot life is shorter at higher temperatures, i.e., between about 80° C. and 130° C. for ε-caprolactam, and at temperatures of about 130°–240° C. the ε-caprolactam polymerization reaction proceeds within a few minutes when using polymeric initiators having such less reactive terminals. The reactions will proceed even faster under such temperature conditions when other terminal groups are used as the initiator. The bulk polymerization reaction is usually conducted at atmospheric pressure and at a temperature of about 130 to 260° C. The reaction can be conducted at a temperature which is above or below the melting point of the resulting block-copolymer, and above that of the lactam monomer. The use of elevated pressure is not required for the polymerization reaction. The bulk polymerization reaction requires a polymerization period of about 1 to 15 minutes at 130°–260° C. depending on the lactam(s) employed, the catalyst concentration, and the polymerization temperature. The bulk polymerization reaction should be carried out under anhydrous conditions, i.e., in the presence of no more than about 0.2 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and of destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the block copolymer and the molded objects can both be formed in one step. Where the polymerization is conducted in such molding devices, conventional molding pressures may be employed in order to simultaneously form the molded object with the in situ formed block copolymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones, Decalin and hexamethylphosphoramide at temperatures of about 100° C. up to the boiling point of the solvent; or at temperatures of about 130 to 240° C. in dispersion systems such as those disclosed in U.S. 3,061,-592 and 3,383,352, and by G. B. Gechele and G. F. Martins in J. Applied Polymer Science, 9, 2939 (1965).

ADJUVANTS

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular block copolymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for the intended purpose. Thus, a stabilizer would be used in a stabilizingly effective quantity, and the fillers would be used in effective quantities therefor.

Examples II–IV

Using the same procedure as that employed in Example I, except for the amount of butyl lithium employed in the preparation of the chloroformate terminated polystyrene initiators, three other AB type block copolymers were prepared. The amounts of butyl lithium used in these examples, and the R.V., percent by weight of nylon-6 components, and $T_g$ and $T_m$ of the resulting block copolymers are listed in Table X, and various mechanical properties of these copolymers are also listed below in Table XI.

TABLE X

| Example | Mls. of butyl lithium | R.V.[1] | Percent $N_6$[2] | $T_g$,[3] °C. | $T_m$,[4] °C. |
|---|---|---|---|---|---|
| II | 0.5 | .77 | 80.0 | 90 | 210 |
| III | 1.5 | .38 | 50.6 | 100 | 215 |
| IV | 1.0 | .49 | 63.8 | 80 | 220 |

[1] 0.2% solution in benzene (polystyrene block).
[2] Based on nitrogen analysis on block copolymer.
[3] Polystyrene $T_g$ of block copolymer.
[4] Nylon 6 melting point of block copolymer.

TABLE XI

| Copolymer of example | R.V.[1] | M.I.[2] | T.M., p.s.i. | T.S., p.s.i. | Elongation at break (percent) | Pendulum impact, ft. lbs./in.[3] |
|---|---|---|---|---|---|---|
| II | 4.23 | 5 | 165,000 | 4,950 | 27 | 68 |
| III | 2.14 | 55 | 170,000 | 4,270 | 12 | 9 |
| IV | 8.60 | 10 | 150,400 | 5,100 | 9 | 4 |

[1] R.V. of block copolymer as a 0.2% solution in m-cresol.
[2] Melt index at 250° C., 1P.

NOTE.—T.M.=Tensile modulus; T.S.=Tensile strength.

Example V

Polystyrene-nylon 6 block copolymer made from polystyrene initiator prepared using DEAB as initiator.—Styrene (104 grams, 1 mol) (freshly distilled) was placed in a test tube equiped with screw cap and DEAB (diethyl-azo-isobutyrate) (1 gram, 3.9 moles) was added to the tube. The mixture was flushed with argon via a capillary tube for two minutes. The test tube was then closed and placed in a constant temperature oil bath at 85° C. for twenty-four hours. The resulting mixture was cooled, the tube was broken and the polymer ground on a Wiley mill. The resulting polymer was used, as obtained, to initiate the polymerization of ε-caprolactam. The polystyrene initiator exhibited an R.V. of 0.68 (0.2% in benzene at 25° C.) and was terminated predominantly at both ends by terminals of the structure

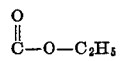

The thus terminated polystyrene (50 grams) and ε-caprolactam (50 grams, 0.442 mole) were added to a 500 ml. round-bottom, 3-neck flask equipped with mechanical stirrer and two Claisen heads to expand the vessel to a 5-neck system. The system was also equipped with gas inlet, septum cap and thermometer and connected to a receiving flask which, in turn, was equipped with reflux condenser and drying tube. Chlorobenzene (50 ml.) was added and distilled with vigorous stirring into the receiving flask employing an oil bath as a heating medium. After the chlorobenzene was removed, the oil bath was brought to a temperature of 220° C. and sodium caprolactam catalyst (5 ml.) was injected into the system under argon. Stirring was continued for two minutes, after which it was stopped and the stirring rod lifted to the top of the flask above the molten mass. Heating at 220° C. was continued for ten minutes under argon. The resulting mixture was cooled, the resulting mixture of AB and ABA type copolymers was broken into pieces, crushed on a Wiley mill, extracted with methanol for forty-eight hours on a Soxhlet extractor and dried in vacuo at 110° C. for twenty-four hours. The resulting block copolymer contained, upon analysis, 5.6% by weight of nitrogen, which corresponds to 45.2% weight percent of nylon-6 blocks in the copolymer. The block polymer had an R.V. (0.2% in m-cresol) of 0.95 and a melt index (250° C., 1P) of 62. The mechanical properties of the block copolymer were as described below:

| | |
|---|---|
| Tensile modulus (p.s.i.) | 223,000 |
| Tensile strength (p.s.i.) | 2,600 |
| Elongation at break (percent) | 1 |
| Pendulum impact (ft. lbs./in.³) | 1 |
| $T_g$ (polystyrene) (°C.) | 90 |
| $T_m$ (nylon-6) (°C.) | 215 |

The procedure employed above to make polystyrene with ester terminals can also be used to make polyacrylonitrile, styrene-acrylonitrile and other vinyl polymers with similar terminals, and such other vinyl polymers can also be used as lactam polymerization initiators in accordance with the present invention.

Examples VI–X

Using the same procedure as that employed in Example V, except for the amount of DEAB employed in the preparation of the

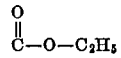

terminated polystyrene, five other block copolymers were prepared. The amounts of DEAB and reaction times used in these Examples VI to X, as well as the R.V. of the resulting polystyrene initiators are listed below in Table XII. The R.V., melt index (MI) and percent by weight of nylon-6 blocks in the block copolymers made in Examples VI–X are listed below in Table XIII. Table XIV below lists various other physical properties of the block copolymers made in Examples VI–X.

TABLE XII.—PREPARATION OF POLYSTYRENE

| Example | Percent DEAB by weight | Reaction time, hrs.[1] | R.V.[2] |
|---|---|---|---|
| VI | 2 | 24 | .44 |
| VII | 0.75 | 16 | .52 |
| VIII | 1 | 24 | .80 |
| IX | 1 | 24 | .93 |
| X | 0.30 | 24 | 1.50 |

[1] Time in oil bath at 85° C.
[2] 0.2% solution in benzene at 25.0° C.

TABLE XIII.—POLYSTYRENE/NYLON 6 BLOCK COPOLYMERS

| Example | R.V.[1] | M.I. (250° C., 1P) | Percent Nylon 6 |
|---|---|---|---|
| VI | 1.02 | 42.0 | 48.4 |
| VII | 1.80 | 32.8 | 53.2 |
| VIII | 2.34 | 6.4 | 72.8 |
| IX | 1.68 | 21.0 | 51.6 |
| X | 1.07 | 14.6 | 54.8 |

[1] 0.2% solutions in m-cresol at 25.0° C.

TABLE XIV.—POLYSTYRENE/NYLON 6 BLOCK COPOLYMERS

| Example | T.M., p.s.i. | T.S., p.s.i. | Elongation at break (percent) | Pendulum impact, ft. lb./in.[3] | $T_g$,[1] °C. | $T_m$,[2] °C. |
|---|---|---|---|---|---|---|
| VI | 195,000 | 3,800 | 2 | ~1 | 95 | 215 |
| VII | 217,000 | 2,350 | 1 | ~1 | 90 | 218 |
| VIII | 300,000 | 7,700 | 14 | 26 | 95 | 210 |
| IX | 192,500 | 2,200 | 1 | ~1 | 85 | 220 |
| X | 212,000 | 5,700 | 4 | 2 | 90 | 215 |

[1] Polystyrene block $T_g$.
[2] Nylon-6 block melting point.

Example XI

Preparation of a block copolymer from polyethylene (M.I.=40) and nylon-6 at ~60% (by weight) of nylon-6.—ε-Caprolactam (60 grams, 0.53 mole) and 40 grams of polyethylene were added to a 500-ml., 3-neck, round-bottom flask equipped with mechanical stirrer and two Claisen heads to expand the flask to a 5-neck flask. The polyethylene initiator had an M.I. of 40 and had terminals of the structure

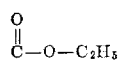

at either one or both ends of the polymer backbone. One Claisen head was equipped with an argon inlet and septum cap for catalyst introduction. The second Claisen head was equipped with thermometer and connected to a receiving flask which, in turn, was equipped with a reflux condenser and drying tube. Chlorobenzene (50 ml.) was introduced into the flask and distilled into the receiving flask under argon (~135–155° C.) using an oil bath as the heat source. The temperature of the oil bath was brought slowly up to 230° C. and, after the chlorobenzene was completely removed, the sodium caprolactam catalyst solution (5 mls.) was injected into the flask. The resulting mixture was stirred vigorously for two minutes and then stopped and the stirring rod lifted to the top of the flask out of the molten mass. Heating was continued for eight minutes, and the reaction vessel then cooled. After cooling, the resulting mixture of AB and ABA block copolymers was broken into pieces, crushed on a Wiley mill, and extracted with methanol on a Soxhlet extractor to remove any residual monomer (unreacted ε-caprolactam). The resulting resin was dried in vacuo at 120° C. for four days. Nitrogen analysis indicated that the block copolymer contained, by weight, 7.88% nitrogen, which corresponds to a nylon-6 block copolymer content of 63.6 weight percent.

The reduced viscosity of the block copolymer (0.2 g./100 ml., 25° C., m-cresol) was 1.23. The melt index (1P at 250° C.) was 24. It was colorless and had excellent mechanical properties as follows:

| | |
|---|---|
| Tensile strength (p.s.i.) | 6,700 |
| Tensile modulus (p.s.i.) | 116,000 |
| Elongation at break (percent) | 92 |
| Pendulum impact, ft. lbs./in.[3] | 80 |

This block copolymer also has two melting points, one at 95° C. for the polyethylene blocks, and one at 215° C. for the nylon-6 blocks.

Examples XII–XIV

Using the same procedure as that employed in Example XI, except for the weight percent of the polyethylene (DEAB initiated) employed, three other block copolymers were prepared. The polyethylene initiator used in Example XII had a melt index of 40, and the polyethylene initiator used in Examples XIII–XIV had a melt index of 1. The amounts of polyethylene initiator used in these examples, and the weight percent of nylon-6 blocks in the resulting block copolymers are listed below in Table XV. The mechanical properties of the resulting block copolymers are listed below in Table XVI.

TABLE XV.—POLYETHYLENE/NYLON 6 BLOCK COPOLYMERS

| Example | Percent weight polyethylene | Percent weight nylon 6 [1] |
|---|---|---|
| XII | 52.0 | 48.0 |
| XIII | 28.7 | 71.3 |
| XIV | 50.8 | 49.2 |

[1] After 24 hours extraction with boiling methanol, determined from nitrogen analysis.

All of the block copolymers of Examples XII and XIV were processible and soluble, indicating true thermoplasticity. The materials had a relatively high melt index indicating easy processibility while maintaining a high melting point (~210–225° C.) characteristic of the nylon-6 block. The copolymers exhibit a second $T_m$ as seen in Table XVI characteristic of the polyethylene block. This $T_m$ generally occurs around 100° C. as seen by the drop in modulus of the products.

As described previously, the copolymer products of Examples XII to XIV may be mixtures of AB and ABA block copolymers. The relative abundance of each was not determined. Homopolymers may also be present due to a lack of ester functionality in some of the polyethylene molecules. Extraction of the block copolymers of Examples XII to XIV with chlorobenzene indicated that all the products were comprised of at least 90% by weight of block copolymers. The mechanical properties were not greatly changed by the extraction procedures.

Example XV

Preparation of a block copolymer of poly(alpha-methyl styrene) and nylon-6.—(A) Preparation of the poly-(alpha-methyl styrene) living polymer: To a 500-ml., round-bottom, 3-neck flask equipped with a magnetic stirrer, rubber septum cap, argon inlet, and exit tube was added 250 mls. of toluene, 40 mls. of tetrahydrofuran and 100 mls. of alpha-methyl styrene. The glassware was flame-dried and the solvents freshly distilled before use. Dry argon was circulated during the reaction. The mixture was brought to 35° C. and maintained at that temperature (using an ice bath) while 2.0 mls. of a 40% by weight dispersion of sodium in mineral oil was added to the reaction mixture via a syringe. After fifteen minutes of reaction time at 35° C., the solution was cooled to 0° C. and allowed to stand for thirty minutes.

The molecular weight of the resulting poly(alpha-methyl styrene) was determined by coagulating an aliquot sample in methanol. The resulting precipitate was filtered and dried and possessed an R.V. of 0.14 (0.2 g./100 ml., benzene, 25.0° C.). Based on the well-known equation $$[\eta] = 1.08 \times 10^{-4} \, M^{0.71}$$

where $[\eta]$ represents the R.V. and M is the molecular weight, the poly(alpha-methyl styrene) possessed a viscosity average molecular weight of about 25,000.

The remainder of the solution was used without isolation in the block copolymerization reaction. The concentration of poly(alpha-methyl styrene) in this solution was about 25% by weight. Two-hundred mls. of the solution containing the living poly(alpha-methyl styrene) were placed in a 500-ml., a round-bottom, 3-neck flask equipped with a distilling head, mechanical stirrer, argon inlet and a thermometer. Dry argon was circulated during the reaction. Five mls. of a 0.5 wt. percent solution ($<10^{-4}$ moles) of Bisphenol A dichloroformate in toluene were added. The red color of the living oligomer disappeared immediately. This indicates that end-capping took place.

(B) Block copolymerization: The above mixture was heated to 120° C. and 25 gms. of ε-caprolactam were charged into the flask. The ε-caprolactam was dried and added in the melt via a syringe. About 100 mls. of toluene were distilled so as to concentrate the mixture. The

TABLE XVI.—POLYETHYLENE/NYLON 6 BLOCK COPOLYMERS

| Copolymer of example | R.V.[1] | M.I., 250° C., 1P | T.M., p.s.i. | T.S., p.s.i. | Elongation at break, percent | Pendulum impact, ft. lbs./in.[3] | M.P.,[2] ° C. | M.P.,[3] ° C. |
|---|---|---|---|---|---|---|---|---|
| XII | 1.06 | 61 | 96,000 | 6,000 | 105 | 125 | 105 | 220 |
| XIII | 1.31 | 79 | 125,000 | 7,100 | 101 | 72 | 95 | 214 |
| XIV | .97 | 93 | 102,000 | 6,800 | 98 | 131 | 100 | 218 |

[1] 0.2 gm./100 ml. at 25.0° C. in m-cresol.
[2] Melting point of polyethylene blocks.
[3] Melting point of nylon-6 blocks.

distillation head was removed and replaced by a reflux condenser. At this point, 8 mls. of a separate catalyst solution containing 4 mole percent of sodium $\epsilon$-caprolactam in $\epsilon$-caprolactam were added. Thus, the catalyst concentration based on the total added $\epsilon$-caprolactam was about 1 mole percent. The temperature was increased to 170° C. Rapid polymerization took place and a solid slurry of polymer in toluene was obtained after fifteen minutes. The solid was separated and ground on a Wiley mill. It was subjected to two extractions, first with methylene chloride and then with methanol. The methylene chloride eliminated the unreacted alpha-methyl styrene monomer and oligomer, while the methanol extraction removed the unreacted $\epsilon$-caprolactam. Eleven weight percent of material was extracted with methylene chloride, and eight weight percent with methanol. After drying, the block copolymer possessed an R.V. of 1.76 (.2 g. 100 ml., m-cresol, 25° C.). Analysis indicated that the block copolymer contained 6.47% nitrogen, which corresponds to a Nylon 6 block content of 52 weight percent.

Example XVI

Preparation of a block polymer of poly(alpha-methyl styrene) and nylon-6.—In this experiment, a higher molecular weight block of poly(alpha-methyl styrene) was used, than was used in Example XV. As a result, better phase separation in the block copolymer took place and the properties of this block copolymer were more representative of this class of materials.

The *experimental* details were similar to those described in Example XVI.

The reduced viscosity of the poly(alpha-methyl styrene) initiator was 0.35 (.2 g./100 ml.; benzene, 25.0° C.), which corresponds to a molecular weight of about 91,500.

The block copolymer possessed the following characteristics after the extractions and drying.

R.V.=1.87 (0.2 g./100 ml., m-cresol, 25.0° C.)
Percent nitrogen=8.94
Percent nylon 6=72.2

A compression-molded film showed the following mechanical properties:

Tensile modulus (p.s.i.) _____ 148,000.
Tensile strength (p.s.i.) _____ 6,800.
Elongation at break (percent) _____ 71.
Pendulum impact _____ 6 ft. lbs./in.³.
$T_g$ _____ 40° C., 150° C.
$T_m$ _____ 210° C.

By way of comparison, a physical blend was prepared from nylon-6 homopolymer (0.98 R.V. at 0.1 g./dl. in m-cresol at 25° C.) and poly(alpha methyl styrene) homopolymer (0.24 R.V. at 0.2 g./dl. in CHCl₃ at 25° C.). A molded film prepared from this blend was very cloudy and brittle, indicating incompatibility.

It is clearly seen that the block copolymer of Example XVI had a high stiffness and was useful at high temperatures. In addition, the water absorption properties of this copolymer were qualitatively observed (weight gain during ambient exposure at room temperature) to be about one-half of that observed for nylon-6 homopolymer.

What is claimed is:

1. An improved process for anionically polymerizing lactam monomer with anionic lactam polymerization catalyst and anionic lactam polymerization initiator so as to form block copolymer from polymerized units of said lactam monomer and units of said initiator, which comprises:

using as said initiator at least one vinyl polymer which comprises at least one terminal group which is active towards reaction with said monomer, or an alkali or alkaline earth metal salt of said monomer, so as to form an actively substituted lactam, said lactam monomer and said vinyl polymer being used in such quantities as to provide said block copolymer with a lactam polymer content of about 20 to 80 weight percent and a vinyl polymer content of about 80 to 20 weight percent, said vinyl polymer having the structure

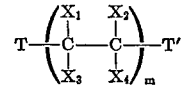

wherein $X_1$, $X_2$, $X_3$ and $X_4$ are the same or different and are selected from the group consisting of H, $C_1$ to $C_{20}$ hydrocarbon radicals, halogen radicals, OR', (OR')$_2$, COR', and pyridyl, pyrrolidinyl and carbazolyl radicals, or a pair of $X_1$, $X_2$, $X_3$ and $X_4$ may form a double bond, and wherein R' is a monovalent $C_1$ to $C_{20}$ hydrocarbon radical, m is a whole number of about 16 to 100,000, T is an active terminal group and is selected from the group consisting of COHal, OCOHal, R″COHal, R″OCOHal, COOR′, R″COOR′, R″OCOOR′, COR″COHal, OCOR″OCOHal,

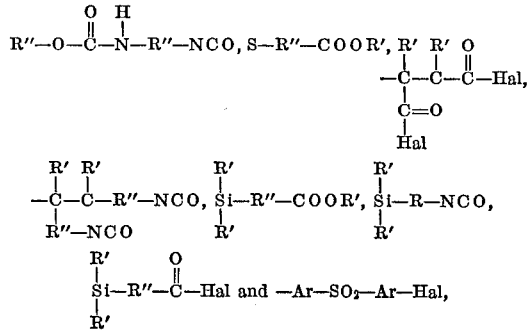

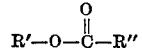 and —Ar—SO₂—Ar—Hal, wherein Hal is a halogen radical, R″ is a divalent $C_1$ to $C_{20}$ hydrocarbon radical, R‴ is a trivalent $C_1$ to $C_{20}$ hydrocarbon radical, and Ar is a divalent mono- or polynuclear aryl moiety residue, and T′ is T or an inactive terminal group selected from the group consisting of H or an inert radical resulting from a chain transfer reaction.

2. A process as in claim 1 wherein at least three of $X_1$, $X_2$, $X_3$ and $X_4$ are H.

3. A process as in claim 2 wherein all of $X_1$, $X_2$, $X_3$ and $X_4$ are H.

4. A process as in claim 3 wherein T and T′ are the same.

5. A process as in claim 4 wherein T and T′ have the structure $$R'-O-\overset{O}{\underset{\|}{C}}-R''$$

6. A process as in claim 5 wherein R′ is ethyl.

7. A process as in claim 6 wherein R″ is 2,2-propylene.

8. A process as in claim 1 wherein at least one of $X_1$, $X_2$, $X_3$ and $X_4$ is a $C_1$ to $C_{20}$ hydrocarbon radical.

9. A process as in claim 8 wherein three of $X_1$, $X_2$, $X_3$ and $X_4$ are H, and one is an aromatic radical.

10. A process as in claim 9 in which the aromatic radical is phenyl.

11. A process as in claim 9 in which the aromatic radical is tolyl.

12. A process as in claim 9 in which T and T′ are the same.

13. A process as in claim 12 wherein T and T' have the structure

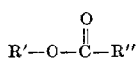

14. A process as in claim 11 wherein R' is ethyl.
15. A process as in claim 12 wherein R'' is 2,2-propylene.
16. A process as in claim 10 wherein T and T' have the structure

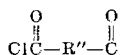

17. A process as in claim 14 wherein R'' is methylene.
18. A process as in claim 1 in which the lactam monomer comprises ε-caprolactam.
19. A process as in claim 6 in which the lactam monomer comprises ε-caprolactam.
20. A process as in claim 7 in which the lactam monomer comprises ε-caprolactam.
21. A process as in claim 6 which is conducted in a shaping device with the simultaneous shaping of the resulting polymer.
22. A process as in claim 10 wherein T and T' have the structure ClCOOR''OOC.
23. A process as in claim 22 wherein R'' is

24. A process as in claim 23 wherein said vinyl polymer is poly-α-methyl styrene.
25. A block copolymer comprising, based on the weight of said copolymer, about 20 to 80 weight percent of at least one block of lactam polymer and about 80 to 20 weight percent of at least one block of vinyl polymer and having one of the structures

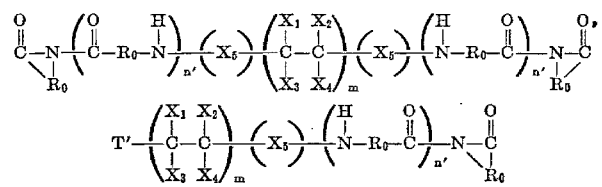

and

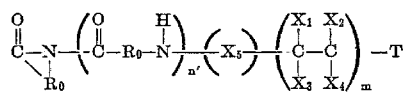

wherein
$R_0$ is that portion of the lactam monomer polymerized which lies between the nitrogen atom and the carbonyl carbon atoms of such lactam,
$X_1$, $X_2$, $X_3$ and $X_4$ are the same or different and are selected from the group consisting of H, $C_1$ to $C_{20}$ hydrocarbon radicals, halogen radicals, OR', (OR')$_2$, COR', and pyridyl, pyrrolidinyl and carbazolyl radicals, or a pair of $X_1$, $X_2$, $X_3$ and $X_4$ may form a double bond, and R' is a monovalent $C_1$ to $C_{20}$ hydrocarbon radical,
$n'$ is a whole number which is $>1$,
$m$ is a whole number of about 16 to 100,000,
$X_5$ is selected from the group consisting of

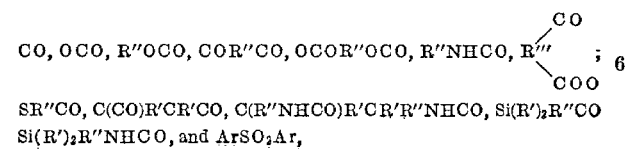

T is selected from the group consisting of

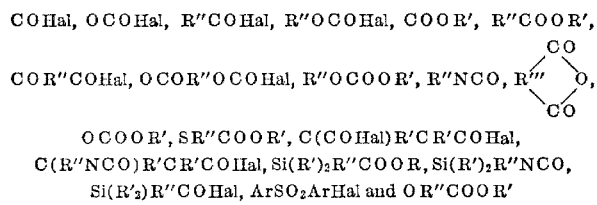

T' is T or an inactive terminal group,
Hal is a halogen radical,
R', R'' and R''' are mono-, di-, and trivalent, respectively, $C_1$ to $C_{20}$ hydrocarbon radicals, and
Ar is a mono- or polynuclear aryl moiety residue.

26. A block copolymer as in claim 25 in which said block of lactam polymer is a block of ε-caprolactam polymer.
27. A block copolymer as in claim 26 in which said block of vinyl polymer is a block of olefin polymer.
28. A block copolymer as in claim 27 in which said block of olefin polymer is a block of polyethylene.
29. A block copolymer as in claim 26 in which said block of vinyl polymer is a block of vinyl aryl polymer.
30. A block copolymer as in claim 29 in which said block of vinyl polymer is a block of polystyrene.
31. A block copolymer as in claim 29 in which said block of vinyl polymer is a block of poly alpha-methyl styrene.
32. A block copolymer as in claim 26 in which $X_5$ is OCO.
33. A block copolymer as in claim 26 in which $X_5$ is CO.
34. A block copolymer as in claim 26 in which $X_5$ is OCOR''OCO.
35. A block copolymer as in claim 34 in which R'' is

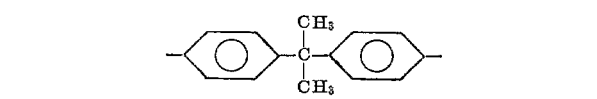

36. A block copolymer as in claim 32 in which said block of vinyl polymer is a block of olefin polymer.
37. A block copolymer as in claim 35 in which said block of vinyl polymer is a block of vinyl aryl polymer.

References Cited

UNITED STATES PATENTS

| | | | |
|---|---|---|---|
| 3,029,221 | 4/1962 | Welch | 260—857 G |
| 3,337,648 | 8/1967 | Aelion | 260—857 G |
| 3,298,977 | 1/1967 | Robertson | 260—857 D |
| 3,136,738 | 6/1964 | Hedrick | 260—857 G |
| 3,471,386 | 10/1969 | D'Alelio | 260—857 G |
| 3,481,923 | 12/1969 | Naarmann | 260—857 D |
| 3,483,104 | 12/1969 | D'Alelio | 260—857 G |
| 3,539,662 | 11/1970 | Hill | 260—857 L |

FOREIGN PATENTS

| | | | |
|---|---|---|---|
| 16,030 | 7/1969 | Japan | 260—857 G |

PAUL LIEBERMAN, Primary Examiner

U.S. Cl. X.R.

260—77.5 CR, 78 R, 857 D, 857 L, 857 UN

UNITED STATES PATENT OFFICE
CERTIFICATE OF CORRECTION

Patent No. 3,770,849      Issue Date November 6, 1973

Inventor(s) M. Matzner, J. E. McGrath

It is certified that error appears in the above-identified patent and that said Letters Patent are hereby corrected as shown below:

Column 3, lines 3-6, that portion of the structure reading "$\}-$ T' " should read -- $\}_m$ T' -- .

Column 3, line 45, that portion of the structures reading "-R'R"NCO" should read
     -- -R', R" NCO -- .

Column 4, line 33, "ketone ethyl" should read
     -- ketone, ethyl -- .

Column 4, line 64, "initiatting" should read
     -- initiating -- .

Column 6, Table I, dotted lines should reflect the fact that no T' (inactive) terminals are provided by the first two free radical initiators.

Column 7, Table III, line 6, "Ch" should read
     --CH-- .

Column 8, Table VI, line 51 "t" should read -- T -- .

Column 10, lines 34-36, that portion of the structure reading "-$X_5$-X" should read -- -$X_5$-A -- .

Column 11, line 28, "T", "$X_5$" and "$X_6$", respectively, should read -- T is -- , -- $X_5$ is --, and
     -- and $X_6$ is -- .

Pat 212:4.72

UNITED STATES PATENT OFFICE
CERTIFICATE OF CORRECTION

Patent No. 3,770,849          Issue Date November 6, 1973

Inventor(s)  M. Matzner, J. E. McGrath

It is certified that error appears in the above-identified patent and that said Letters Patent are hereby corrected as shown below:

Column 12, line 36, "°C" should be indented to be more adjacent the line of temperature values.

Column 20, line 1 "and" should read -- to -- .

Column 23, line 1 of claim 21, "6" should read -- 1 -- .

Column 24, line 9, "C(R"NCO)R'CR'COHal" should read -- C(R"NCO)R'CR'R"NCO -- .

Signed and sealed this 9th day of April 1974.

(SEAL)
Attest:

EDWARD M. FLETCHER, JR.
Attesting Officer

C. MARSHALL DANN
Commissioner of Patents